United States Patent
Eichhorn

(10) Patent No.: US 6,752,891 B2
(45) Date of Patent: Jun. 22, 2004

(54) GLASS PANEL WITH SIMULATED METAL STRIP

(75) Inventor: Keith L. Eichhorn, High Point, NC (US)

(73) Assignee: Glass Unlimited of High Point, Inc., High Point, NC (US)

( * ) Notice: Subject to any disclaimer, the term of this patent is extended or adjusted under 35 U.S.C. 154(b) by 49 days.

(21) Appl. No.: 09/851,056

(22) Filed: May 8, 2001

(65) Prior Publication Data

US 2001/0018133 A1 Aug. 30, 2001

Related U.S. Application Data

(62) Division of application No. 09/512,861, filed on Feb. 24, 2000, now Pat. No. 6,524,674.

(51) Int. Cl.[7] .................................................. B44C 1/24
(52) U.S. Cl. ........................ 156/233; 156/234; 156/241
(58) Field of Search ................................ 156/230, 233, 156/234, 239, 241, 277, 307.5

(56) References Cited

U.S. PATENT DOCUMENTS

| | | | |
|---|---|---|---|
| 2,958,149 A | 11/1960 | Wenig | 41/37 |
| 3,574,766 A | 4/1971 | Chu | 161/190 |
| 3,652,323 A * | 3/1972 | Smith | 117/97 |
| 4,053,344 A | 10/1977 | Hirahara | 156/247 |
| 4,104,432 A * | 8/1978 | Manabe et al. | 428/216 |
| 4,115,180 A | 9/1978 | Scalia | 156/446 |
| 4,438,165 A | 3/1984 | Butler | 428/38 |
| 4,484,970 A * | 11/1984 | Burzlaff et al. | 156/233 |
| 4,488,919 A | 12/1984 | Butler | 156/153 |
| 4,645,555 A * | 2/1987 | Kuboyama | 156/234 |
| 4,690,852 A | 9/1987 | Hull | 428/156 |
| 4,715,137 A * | 12/1987 | Scheve | 40/546 |
| 4,813,990 A | 3/1989 | Thorn | 65/105 |
| 4,849,265 A * | 7/1989 | Ueda et al. | 428/40 |
| 4,952,462 A * | 8/1990 | Bright | 428/542.2 |
| 5,135,797 A * | 8/1992 | Sasaki | 428/201 |
| 5,283,095 A * | 2/1994 | Matsumaru et al. | 428/64 |

(List continued on next page.)

FOREIGN PATENT DOCUMENTS

| | | | | |
|---|---|---|---|---|
| DE | 2433868 A | * | 2/1976 | |
| EP | 0626354 A | | 11/1994 | ........... C03C/17/38 |
| JP | XP 002156328 | | 2/1979 | |
| JP | 57070647 A | * | 5/1982 | |
| JP | XP 002156329 | | 8/1982 | |
| JP | XP 002156327 | | 2/1998 | |

OTHER PUBLICATIONS

Tech Tutorial; RevTech announces breakthrough glass decorating technology; information from the Internet, date unknown, but believed to be prior art.

RevTech Showcases Breakthrough Decorating Technology at FMI; information from the Internet; date unknown, but believed to be prior art.

RSG Zig Zag System; information from the Internet, date unknown, but believed to be prior art.

Resin Stained Glass Limited, Colouring System; information from the Internet, date unknown, but believed to be prior art.

Primary Examiner—Jeff H. Aftergut
Assistant Examiner—John L. Goff
(74) Attorney, Agent, or Firm—Womble Carlyle Sandridge & Rice, PLLC

(57) ABSTRACT

A glass panel having a simulated metal strip applied thereto in a decorative pattern, and a method for making a glass panel having a simulated metal strip applied thereto in a decorative pattern, including a flat panel of glass, a raised bead of air-curable acrylic resin applied in a prescribed pattern to at least one surface of the flat panel of glass, and a metal film overlying the bead of acrylic resin.

4 Claims, 3 Drawing Sheets

U.S. PATENT DOCUMENTS

| | | | | |
|---|---|---|---|---|
| 5,352,532 A | * | 10/1994 | Kline | 428/447 |
| 5,391,247 A | | 2/1995 | Kamen et al. | 156/233 |
| 5,409,416 A | | 4/1995 | Eichhorn et al. | 451/41 |
| 5,411,768 A | | 5/1995 | Knell et al. | 427/386 |
| 5,419,246 A | * | 5/1995 | Bibby | 101/170 |
| 5,578,365 A | * | 11/1996 | Kume et al. | 428/195 |
| 5,585,153 A | | 12/1996 | Kamen et al. | 428/35.7 |
| 5,656,336 A | | 8/1997 | Kamen et al. | 427/511 |
| 5,708,047 A | | 1/1998 | Kamen et al. | 522/31 |
| 5,783,264 A | | 7/1998 | Howes | 428/13 |
| 5,840,391 A | | 11/1998 | Eichhorn et al. | 428/38 |
| 5,853,835 A | | 12/1998 | Leniton | 428/38 |
| 5,853,852 A | | 12/1998 | Eichhorn | 428/167 |
| 6,132,662 A | * | 10/2000 | Preisler et al. | 264/241 |

* cited by examiner

GLASS PANEL WITH SIMULATED METAL STRIP

This application is filed pursuant to 37 C.F.R. §1.53(b) and is a Divisional of application Ser. No. 09/512,861, filed Feb. 24, 2000 now U.S. Pat. No. 6,524,674.

BACKGROUND OF THE INVENTION

The present invention is directed to decorative glass panels, and, more particularly, to glass window and door panels having patterns that simulate strips of metal, such as chrome and brass.

In recent years, decorative glass has increased in popularity in both commercial and residential usage. It is now commonplace for decorative glass sheets to be used in buildings and homes in various types of doors such as entry, storm, and patio doors, as well as for exterior windows such as garden bath windows. Decorative glass has also become increasingly popular for interior glass doors, such as shower doors and French doors, as well as in furniture and architectural applications. As the scope and popularity of usage has grown, so has the demand for more affordable decorative glass products that simulate expensive materials and features. Accordingly, cost effective methods for producing affordable high quality simulated decorative glass products are being sought.

The prior art discloses methods of forming patterns or lettering on materials other than paper, such as glass or plastic, by screen printing, stenciling, or painting. The most popular of these methods has been screen printing. However, its application has been limited to small items such as containers, bottles, dishes, cups, and glasses, and the inks have required UV, or radiation, curing. There is also known a method of applying a foil on top of screen-printed ink to achieve a metallic and attractive appearance, but it has been limited to smaller items and used exclusively for interior applications. These printed products do not stand up to exterior environmental conditions such as heat, cold, ultraviolet light, and moisture, and because they are screen printed, the final products lack a three-dimensional appearance.

SUMMARY OF THE INVENTION

The present invention is directed to a glass panel having decorative patterns formed on at least one surface, whereby those patterns simulate strips of metal, such as chrome and brass.

Accordingly, one aspect of the present invention is to provide a glass panel having a simulated metal strip applied thereto in a decorative pattern for interior applications such as French doors where exposure to the elements is not a concern. A flat panel of glass of the size and type appropriate for the application is chosen. Glass panels, including mirrors, may be annealed, strengthened, safety-tempered, laminated, or safety-backed. A raised bead of an air-curable acrylic resin is applied in a desired pattern to at least one surface of the glass panel. One such air-curable resin is formed by mixing a resin such as R.L. ACRY 14 or C.C.B. ACRY 14 with a resin hardener such as R.L.H. ACRY 15 or C.C.B.H. ACRY 15, manufactured by Creative Resins of Kent, England. To achieve the desired appearance, the raised bead of acrylic resin is optimally from about 2.0 mm to about 5.0 mm in width and from about 0.8 mm to about 1.1 mm in height. A metal film suitable for interior applications is heat-transferred from a film sheet to the cured resin bead. The film sheet is a substrate or backing sheet having a thin layer of aluminum deposited thereon. The metal film has an adhesive layer on the outer surface and a clear layer of protective material between the aluminum and the substrate. The outer layer of adhesive bonds the aluminum to the acrylic resin bead. To simulate different metals, a layer of dye can be included between the layer of aluminum and the clear layer of protective material. One metal film suitable for this interior application is manufactured by Crown Roll Leaf, Inc. in Patterson, N.J. as item EXP-6884-E.

A second aspect of the present invention is to provide a decorative glass panel having a simulated metal strip for use in exterior environments or interior environments, such as baths and shower areas, where conditions are harsh. For such applications, the glass panel is annealed, tempered, or laminated and can be insulating or monolithic; i.e., a single uniform panel. The same acrylic resin used for the interior application is also suitable for exterior use. Following application and curing of the raised acrylic bead, a metal film suitable for exterior exposure is heat-transferred from a film sheet to the cured resin bead. The metal film must be capable of withstanding temperatures up to 200° F. and must be impervious to moisture and ultraviolet light. One such metal film suitable for this application is manufactured by Foilmark-TPF in East Brunswick, N.J. as item CR0-050-691 for chrome, and item CR-5055-691 for brass-colored chrome. This film is also comprised of three layers. An outer layer of adhesive bonds to the raised acrylic bead. The second, or intermediate layer, is chrome, and the inner most layer is a clear protective material. Where a brass-colored appearance is desired, a layer of ferrous oxide is provided between the layer of chrome and the top layer of protective material.

A third aspect of the present invention is to provide a decorative window or door consisting of a peripheral support frame and a glass panel secured and supported by that frame. Depending upon the application chosen, the peripheral support frame desirably has a pair of opposed spaced-apart side walls and a pair of opposed spaced-apart end walls. The frame may be formed in any number of ways and using a variety of materials to support the glass panel including, for example, conventional wooden frames wherein the glass panel is placed within an opening formed in the frame and thereafter secured with peripheral molding or the like. The glass panel selected for the window or door would be formed as described in the first or second aspects above.

Another aspect of the present invention is to provide a method for making a glass panel having a simulated metal strip applied to at least one surface. A computer-driven plotter is used to apply a raised bead of air-curable acrylic resin in a desired pattern on a plotter table. One suitable computer-driven plotter is an X-Y plotter manufactured by International Robotix Industries, Inc. of Vancouver, British Columbia, Canada. Once the raised resin bead has been applied, the resin is allowed to air-cure for 24 to 48 hours at an ambient temperature of approximately 72° F. Alternatively, higher ambient temperatures or convection heating will cure the resin at an accelerated rate. Before the metal film can be applied, the resin must be cured to a sufficient hardness. A durometer, an instrument consisting of a flat or blunt indenter point under pressure used to measure the hardness of materials, can be used for such a measurement. Specifically, when a durometer with a 1.0 mm flat point needle is completely compressed against the resin bead for 3 seconds, creating a force of 10 Newtons at the needle, a reading of 65% or above on the 0 to 100% scale is ideal for the subsequent application of the metal film. This means that the resin bead will not deform during application of the metal film. The metal film described above, whether for interior or exterior use, is applied in the same manner. Horizontal panels of glass are passed through a hot stamping machine, such as that manufactured by Acro Mark Company, Inc. of Berkeley Heights, N.J. A roll of metal film at least the width of the glass panel is brought into contact with the glass panel. A heated rubber roller presses the metal film against the raised acrylic resin bead causing it to bond to the bead. Because the adhesive layer in the metal film is specifically formulated for compatibility with the resin, and not the glass, the metal film corresponding only to the acrylic resin bead, and bonded thereto, is pulled off of the roll as the roll of metal film is lifted from the glass panel, after passing under the heated roller. Ideal bonding occurs at roller temperatures between about 300° F. and 380° F. for interior metal film and between about 350° F. and 430° F. for exterior metal film; however, these temperature ranges may vary as daily indoor ambient temperatures and glass panel surface temperatures vary. No post-curing or other treatment is required.

These and other aspects of the present invention will become apparent to those skilled in the art after a reading of the following description of the preferred embodiment when considered with the drawings.

DESCRIPTION OF THE PREFERRED EMBODIMENTS

Figure 1:
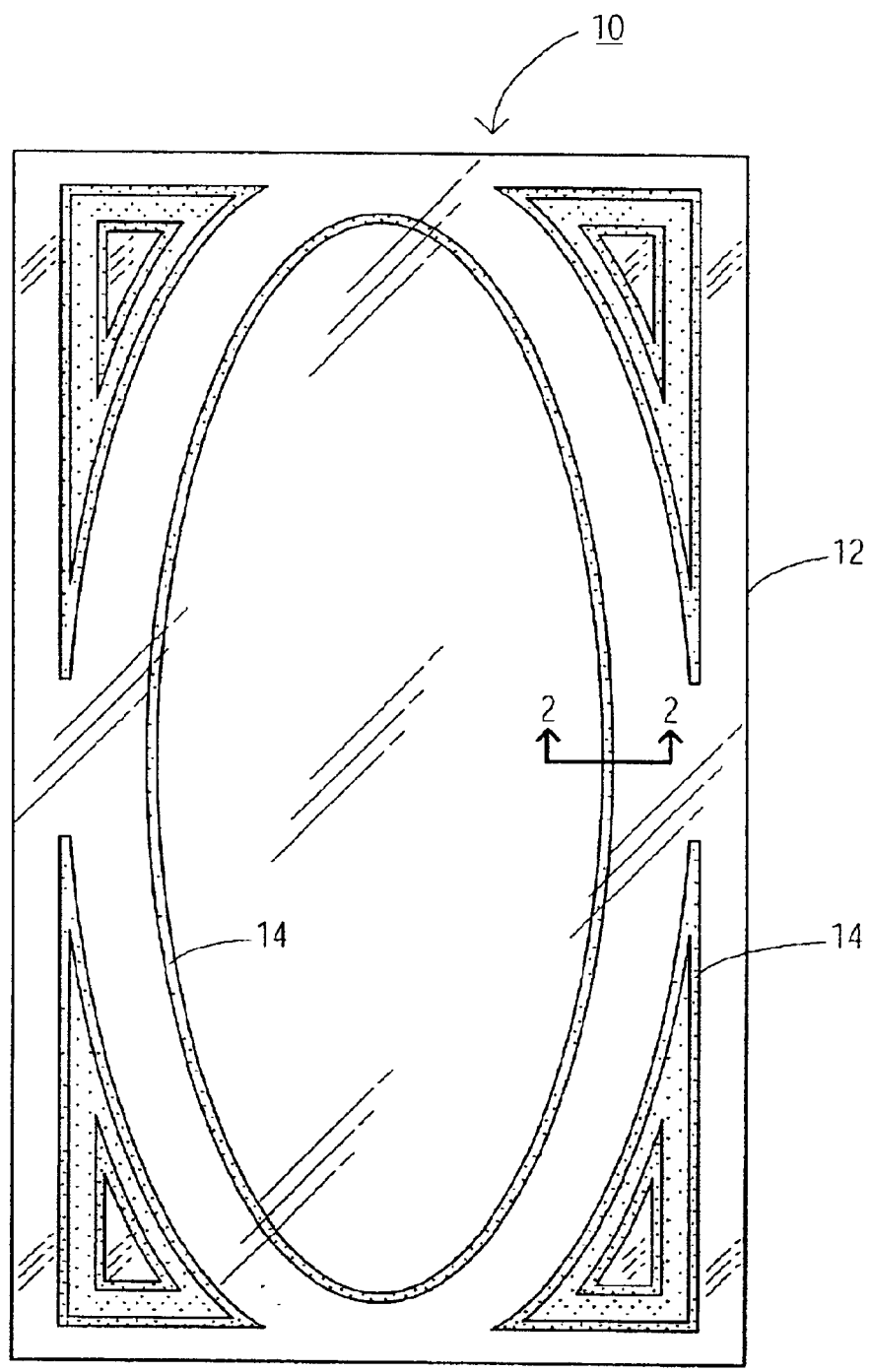
FIG. 1 is a front plan view of a decorative glass panel with a simulated metal strip attached thereto according to the present invention.

Referring now to the drawings in general and FIG. 1 in particular, it will be understood that the illustrations are for the purpose of describing a preferred embodiment of the invention and are not intended to limit the invention thereto. As seen in FIG. 1, a glass panel with a simulated metal strip attached thereto, generally designated 10, is shown constructed according to the present invention. The glass panel with simulated metal strip 10 includes a flat panel of glass 12 and simulated metal strip 14.

Figure 2:
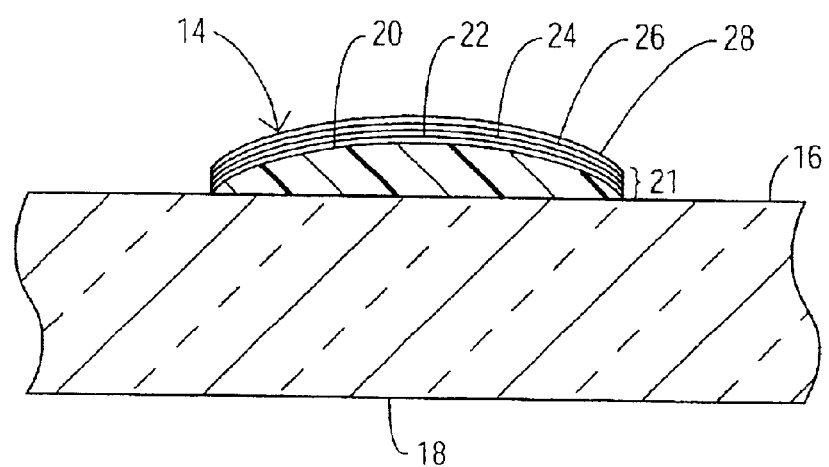
FIG. 2 is a schematic, cross sectional view of the decorative glass panel taken along line 2—2 of FIG. 1.

Referring to FIG. 2, glass panel 12 has an outer surface 16 and an inner surface 18. A glass panel 12 of appropriate type and size is chosen for the particular application. Glass panels, including mirrors, may be annealed, strengthened, safety-tempered, laminated, or safety-backed. If intended for outside use, glass panel 12 can be insulating or monolithic; i.e., a single uniform panel.

The simulated metal strip 14 includes a raised bead of air-curable acrylic resin 20 and a metal film 21. The raised bead of acrylic resin 20 is applied to at least one of the surfaces 16, 18 of glass panel 12 to form a decorative pattern, the number of possible patterns being unlimited. To achieve the desired appearance, the raised bead of acrylic resin 20 is desirably from about 2.0 mm to about 5.0 mm in width and from about 0.8 mm to about 1.1 mm in height. One suitable air-curable acrylic resin is formed by mixing a resin such as R.L. ACRY 14 or C.C.B. ACRY 14, with a resin hardener such as R.L.H. ACRY 15 or C.C.B.H. ACRY 15, manufactured by Creative Resins of Kent, England. However, other comparable acrylic resins may be used.

To complete the simulated metal strip 14, a metal film 21 is heat-transferred from a film sheet to the cured bead of acrylic resin 20. The film sheet is a substrate or backing sheet having a layer of metal deposited thereon. Metal film 21 includes three layers 22, 24, and 28. An adhesive layer 22, specifically formulated to be compatible with both the resin and with metal, bonds the metal film 21 to the raised bead 20. An intermediate layer of metal 24 provides the metal appearance. For interior use, layer 24 is aluminum. Alternatively, for exterior use, layer 24 is chrome. Overlying layer 24 is a layer of protective material 28. To achieve a brass appearance, for interior use metal film 21 includes a layer of dye 26 between layer 24 and layer 28. Alternatively, for exterior use, layer 26 is ferrous oxide. One suitable metal film 21 for interior use is manufactured by Crown Roll Leaf, Inc. of Patterson, N.J. as item EXP-6884-E. A suitable metal film 21 for exterior use is manufactured by Foilmark-TPF of East Brunswick, N.J. as item CRO-050-691 for chrome-colored film, and item CRO-5055-691 for brass-colored film.

Figure 3:
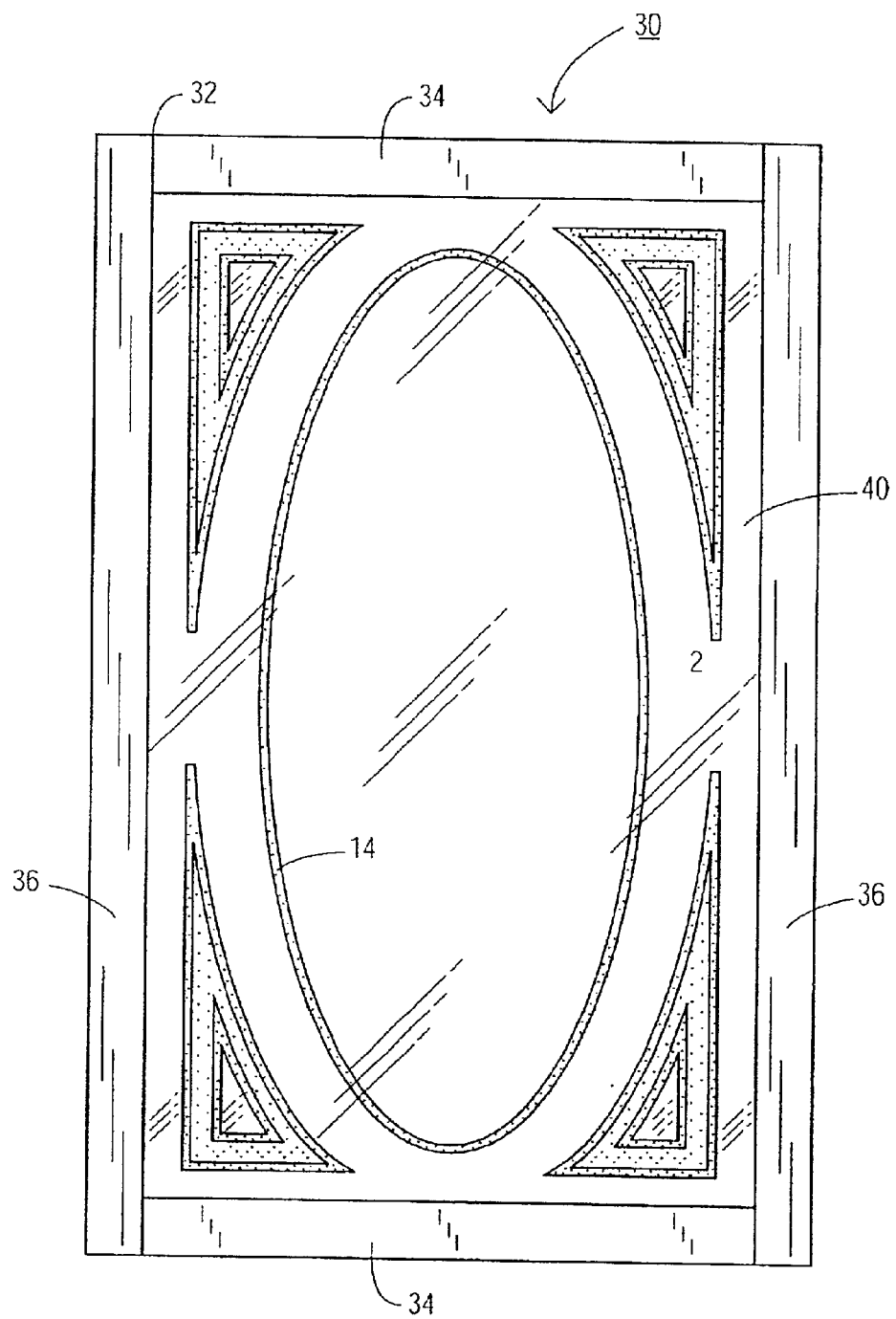
FIG. 3 is a front plan view of a decorative window or door according to the present invention.

Referring now to FIG. 3, another aspect of the present invention is a decorative window or door, shown generally as 30, comprising a peripheral support frame 32 securing and supporting glass panel 40. The peripheral support frame 32 has a pair of opposed spaced apart side walls 36 and a pair of opposed spaced apart end walls 34, and may be formed in any number of ways and using a variety of materials to support glass panel 40 including, for example, conventional wooden frames wherein the glass panel is placed within an opening formed in the frame and thereafter secured with molding or the like. The glass panel 40 would be formed as shown in FIGS. 1 and 2 and described hereinabove.

Turning again to FIGS. 1 and 2, in making a glass panel having a simulated metal strip applied thereto, a raised bead of air-curable acrylic resin 20, as described above, is applied with a computer-driven plotter in a prescribed decorative pattern to a horizontal flat glass window or door panel 12 outer surface 16 or inner surface 18. One suitable computer-driven plotter is an X-Y plotter manufactured by International Robotix Industries, Inc. of Vancouver, British Columbia, Canada. The raised bead of acrylic resin 20 is then air-cured at an ambient temperature of approximately 72° F. for 24 to 48 hours. Alternatively, exposure to convection heating or to higher ambient temperatures will accelerate the curing. The bead of acrylic resin 20 is cured to a sufficient hardness that will allow subsequent application of a metal film 21. A durometer, an instrument consisting of a flat or blunt indenter point under pressure used to measure the hardness of materials, can be used for such a measurement. Specifically, when a durometer with a 1.0 mm flat point needle is completely compressed against the resin bead 20 for 3 seconds, creating a force of 10 Newtons at the needle, a reading of 65% or above on the 0 to 100% scale is ideal for the subsequent application of the metal film 21. This means that the resin bead will not deform during application of the metal film. Metal film 21 is applied in the same manner, whether for interior or exterior applications. A horizontal glass panel 12 with a cured raised bead of acrylic resin 20 bonded thereto is passed through a hot stamping machine, such as that manufactured by Acro Mark Company, Inc. of Berkeley Heights, N.J. A roll of metal film 21, at least as wide as the glass panel 12, is brought into contact with glass panel 12. A heated rubber roller presses the metal film 21 against the raised acrylic resin bead 20 as glass panel 12 passes under the roller. Because the adhesive layer in metal film 21 is specifically formulated for compatibility and bonding with the resin, and not the glass, metal film 21 corresponding only to the acrylic resin bead 20 pattern, and bonded thereto, is pulled off of the roll as the roll of metal film is lifted from glass panel 12 after passing under the heated rubber roller. Rubber roller temperatures of from about 300° F. to about 380° F. are ideal for the application of interior metal film and from about 350° F. to 430° F. for exterior metal film; however, these temperature ranges may vary as daily indoor ambient temperatures and glass panel surface temperatures vary. Upon removal from the hot stamping machine, the manufacture of a glass panel with a simulated metal strip 10 is complete. No post-curing or other treatment is required. If the user desires that the decorative pattern be applied on both outer surface 16 and inner surface 18 of glass panel 12, then the process described hereinabove is repeated.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A method for making a glass panel having one or more decorative strips thereon which simulate strips of metal in a decorative pattern, comprising:

(a) applying with an X-Y plotter a raised rounded bead of air-curable acrylic resin in a prescribed pattern to at least one surface of the panel, the rounded bead being 0.8–1.1 mm in height above the surface of the glass panel at the highest point and 2.0–5.0 mm in width;

(b) air curing said acrylic resin; and (c) applying a metal film to said raised bead of acrylic resin at a temperature sufficient to bond said metal film to said raised bead of acrylic resin.

2. The method of claim 1 wherein said acrylic resin bead is air-cured at room temperature for 24 to 48 hours until reaching a hardness of 65% on a 0% to 100% durometer scale when a 1.0 mm flat point needle is completely compressed against said resin bead for 3 seconds, creating a force of 10 Newtons at the needle.

3. The method of claim 1 wherein the metal film is aluminum which is applied by pressing the film against said raised bead of acrylic resin with a rubber roller heated to a temperature in the range of 300° F. to 380° F.

4. The method of claim 1 wherein the panel is intended for exterior use and the metal film is chrome which is applied by pressing the film against said raised bead of acrylic resin with a rubber roller heated to a temperature in the range of 350° to 430° F.

* * * * *